(12) United States Patent
Beal et al.

(10) Patent No.: US 7,853,020 B2
(45) Date of Patent: Dec. 14, 2010

(54) SYSTEMS AND METHODS FOR ENHANCED QUANTUM KEY FORMATION USING AN ACTIVELY COMPENSATED QKD SYSTEM

(75) Inventors: A. Craig Beal, Watertown, MA (US); Michael J. Lagasse, Nahant, MA (US); Audrius Berzanskis, Cambridge, MA (US)

(73) Assignee: Mogiq Technologies, Inc., Somerville, MA (US)

( * ) Notice: Subject to any disclaimer, the term of this patent is extended or adjusted under 35 U.S.C. 154(b) by 701 days.

(21) Appl. No.: 11/901,773

(22) Filed: Sep. 19, 2007

(65) Prior Publication Data

US 2009/0074192 A1    Mar. 19, 2009

(51) Int. Cl.
*H04L 9/08* (2006.01)
(52) U.S. Cl. .................................... 380/283
(58) Field of Classification Search ................ 380/283
See application file for complete search history.

(56) References Cited

U.S. PATENT DOCUMENTS

| | | | | |
|---|---|---|---|---|
| 5,243,649 A * | 9/1993 | Franson | ...................... | 380/256 |
| 5,307,410 A * | 4/1994 | Bennett | ...................... | 380/256 |
| 5,757,912 A | 5/1998 | Blow | | |
| 6,028,935 A * | 2/2000 | Rarity et al. | ................. | 380/256 |
| 6,438,234 B1 * | 8/2002 | Gisin et al. | ................. | 380/256 |
| 7,068,790 B1 * | 6/2006 | Elliott | ........................ | 380/278 |
| 7,587,049 B2 * | 9/2009 | Trifonov et al. | ............. | 380/263 |
| 7,606,371 B2 * | 10/2009 | Zavriyev et al. | ............ | 380/283 |
| 7,757,086 B2 * | 7/2010 | Walmsley | ................... | 713/171 |
| 2004/0190725 A1 * | 9/2004 | Yuan et al. | .................. | 380/283 |
| 2005/0047601 A1 * | 3/2005 | Shields et al. | ............... | 380/283 |
| 2007/0064945 A1 * | 3/2007 | Yuan et al. | .................. | 380/263 |
| 2007/0133798 A1 | 6/2007 | Elliott | | |

* cited by examiner

*Primary Examiner*—Farid Homayounmehr
(74) *Attorney, Agent, or Firm*—Opticus IP Law PLLC

(57) ABSTRACT

Systems and methods for enhanced quantum key distribution (QKD) using an actively compensated QKD system. The method includes exchanging quantum signals between first and second QKD stations and measuring the quantum signal error. An error signal $S_E$ representative of the system visibility error is then generated. An error-signal threshold $S_{TH}$ that defines a system visibility error limit is then selected. Those qubits measured with the condition $S_E > S_{TH}$ are called "above-threshold" qubits, while those qubits measured with the condition $S_E \leq S_{TH}$ are called "below-threshold" qubits. Only below-threshold qubits are stored and used to form the final quantum key. This is accomplished by sending a blanking signal $S_B$ to the memory unit where the qubits are stored. The blanking signal prevents above-threshold qubits from being stored therein. The raw quantum key so formed has few errors and thus forms a longer final quantum key for a given number of exchanged quantum signals.

8 Claims, 2 Drawing Sheets

SYSTEMS AND METHODS FOR ENHANCED QUANTUM KEY FORMATION USING AN ACTIVELY COMPENSATED QKD SYSTEM

FIELD OF THE INVENTION

The present invention relates generally to quantum cryptography, and in particular to actively stabilized quantum key distribution (QKD) systems, and systems and methods for forming quantum keys using such systems.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits will introduce errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett ("the '410 patent") and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33 ("Bouwmeester"), which is incorporated by reference herein by way of background information.

The typical so-called "one way" QKD system such as disclosed in the '410 patent, use a "shared interferometer" that includes two interferometer halves, with one half at Alice and one half at Bob. Because the two interferometer halves are located remote from each other, differences in the optical path length of the interferometer halves can arise from local environmental effects. A difference in the optical path length, known as "phase error," reduces the interference visibility ("system visibility") of the single-photon-level optical pulses ("quantum pulses"), which is detrimental to the efficiency of the QKD process.

Accordingly, the typical one-way QKD systems need to be actively stabilized in order to maintain the optical path-length balance of Alice and Bob's shared interferometer to within a fraction of the wavelength (e.g., ~30 nm for 1.5 μm light). This can be done, for example, by passing "classical" pulses (i.e., multi-photon optical pulses) through the shared interferometer at one QKD station (e.g., Alice) and detecting it at the output of the other QKD station (e.g., Bob). The QKD system is thus configured so that the classical optical pulses follow the same optical path traversed by the quantum pulses. Consequently, it is possible to monitor the phase error superimposed upon the qubits by observing the interference of the classical signals at the output of the interferometer. Using error signals generated by these interference patterns, it is possible to produce negative feedback for an actuator adapted to counteract this phase error. In response to the feedback signal, the actuator creates a compensating phase change at a single location (e.g., at Bob) to restore the optical path length balance. An example of an actively stabilized one-way QKD system is described in WIPO PCT Patent Application Publication No. WO2005067189 A1, entitled "Active stabilization of a one-way QKD system," published on Jul. 21, 2005, which patent application is incorporated by reference herein.

When faced with high-frequency or high-amplitude disturbances, the feedback system's tracking range and bandwidth limitations may allow the shared interferometer to momentarily (e.g. over multiple qubit intervals) fall out of balance. In some cases these limitations are manifested by operating near the limits of the actuator range. Due to the periodic behavior of optical interference, the actively stabilized interferometer may have several stable modes of operation. Thus, in the case where the operating range of the actuator covers multiple modes, one solution to contending with limited actuator range is to "reset" the actuator to the center of its operating range when it comes too close to one of the range limits. However, depending on the implementation of this process and/or the speed of the actuator, resetting may cause a sudden spike ("glitch") in phase error as the actuator hops across several modes and re-stabilizes itself at a mode near the midpoint of its operating range. These phase errors in turn are projected onto the quantum signal and thus leads to increased QBER.

Ideally, the control system used in one-way QKD systems will have sufficient bandwidth and range to eliminate any and all phase perturbations that arise. Realistically, this may not always be possible because there are likely other design tradeoffs that prevent such ideal performance. Among these are the insertion loss of these components, the permissible power level of the classical feedback signal, and cost restrictions. It is also conceivable that the QKD system may be employed in an environment where it is subjected to somewhat frequent high amplitude vibrations, such as a mobile military platform. In all of these cases the feedback system alone may not be capable of continuously eliminating the time-varying phase error. This is significant because each erroneous quantum signal bit leads to the loss of multiple error-free bits that are consumed in the error correction and privacy amplification processes.

SUMMARY OF THE INVENTION

One aspect of the invention is a method of forming a quantum key by exchanging quantum signals between first and second QKD stations of an actively stabilized QKD system. The method includes using classical stabilization pulses to monitor the system visibility while quantum signals are being exchanged. The system visibility is the ability of the system to faithfully discriminate between two orthogonal quantum states. The method also includes generating an error signal $S_E$ proportional to the degree of system visibility reduction. The method further includes setting an error-signal threshold $S_{TH}$ that defines an upper bound for the allowable system visibility reduction. The method also includes detecting the quantum signals to form qubits based on the quantum signals, and forming a raw quantum key by storing only below-threshold qubits—that is, qubits for which $S_E \leq S_{TH}$.

Another aspect of the invention is a receiving QKD station of an actively stabilized QKD system adapted to exchange quantum signals over an optical path. The receiving QKD station includes a controller designed to track the system visibility during the exchange of quantum signals and generate therefrom i) an error signal $S_E$ representative of any reduction in the system visibility, and ii) a blocking signal $S_B$ corresponding to quantum signal measurements taken while $S_E > S_{TH}$, wherein $S_{TH}$ is a decision threshold signal corresponding to the maximum allowable system visibility degradation. The receiving QKD station also includes a memory unit in the controller adapted to store qubits, the memory unit being further adapted to perform "signal blanking," wherein the memory unit receives the blocking signal $S_B$ and in response thereto blocks the storing of qubits associated with above-threshold qubits so that the memory unit only stores below-threshold qubits for which $S_E \leq S_{TH}$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

Figure 1:
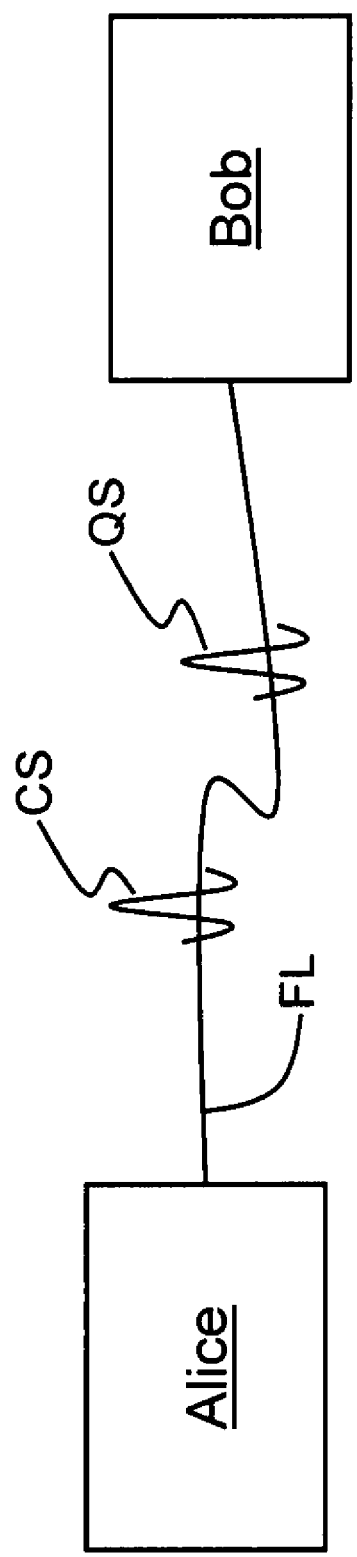
FIG. 1 is a schematic diagram of a general QKD system.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art. Where convenient, the same or like elements are given the same or like reference numbers.

DETAILED DESCRIPTION OF THE PREFERRED EMBODIMENTS

FIG. 1 is a schematic diagram of an actively stabilized QKD system 10 according to the present invention. QKD system 10 includes a QKD station Alice and a QKD station Bob that are optically coupled. In the example embodiment of FIG. 1, Alice and Bob are optically coupled by an optical fiber link FL. Alice and Bob communicate by encoded single-photon-level quantum signals QS. The encoding may be any type of encoding that changes the state of the photon. Usually, polarization encoding or phase encoding is used, as described in Bouwmeester. The present invention applies to any type of encoding scheme and QKD system that requires active stabilization in order to maintain the qubit error rate (QBER) at an acceptable level. In an example embodiment, such active stabilization utilizes classical optical signals CS that have the same or similar wavelength as the quantum signal QS. For example, in a polarization-based QKD system, a polarized classical signal is sent over the optical fiber link FL and is used to determine changes in the polarization state over the QKD system optical path.

In an actively stabilized QKD system 10, errors are introduced in the state of the quantum signals as the system drifts from its optimum operating state due to, for example, environmental effects such as temperature changes or vibrations. Such drifts occur even in actively stabilized system because the active stabilization scheme cannot be made to respond infinitely fast to system changes. This is particularly true where the error-adjusting elements have a relatively slow response time when compared to the qubit transmission rate. In the discussion below, errors in the quantum signals due to system drifts or perturbations (as opposed to errors introduced by an eavesdropper) are referred to generally as "system visibility glitches." System visibility glitches are undesirable because create a transient degradation of system visibility, which generally increases the QBER.

As described in detail below, an aspect of the present invention involves preventing qubits that are coincident with system visibility glitches greater than a decision threshold value from being included in the raw quantum key.

Phase-Encoding QKD System

Figure 2:
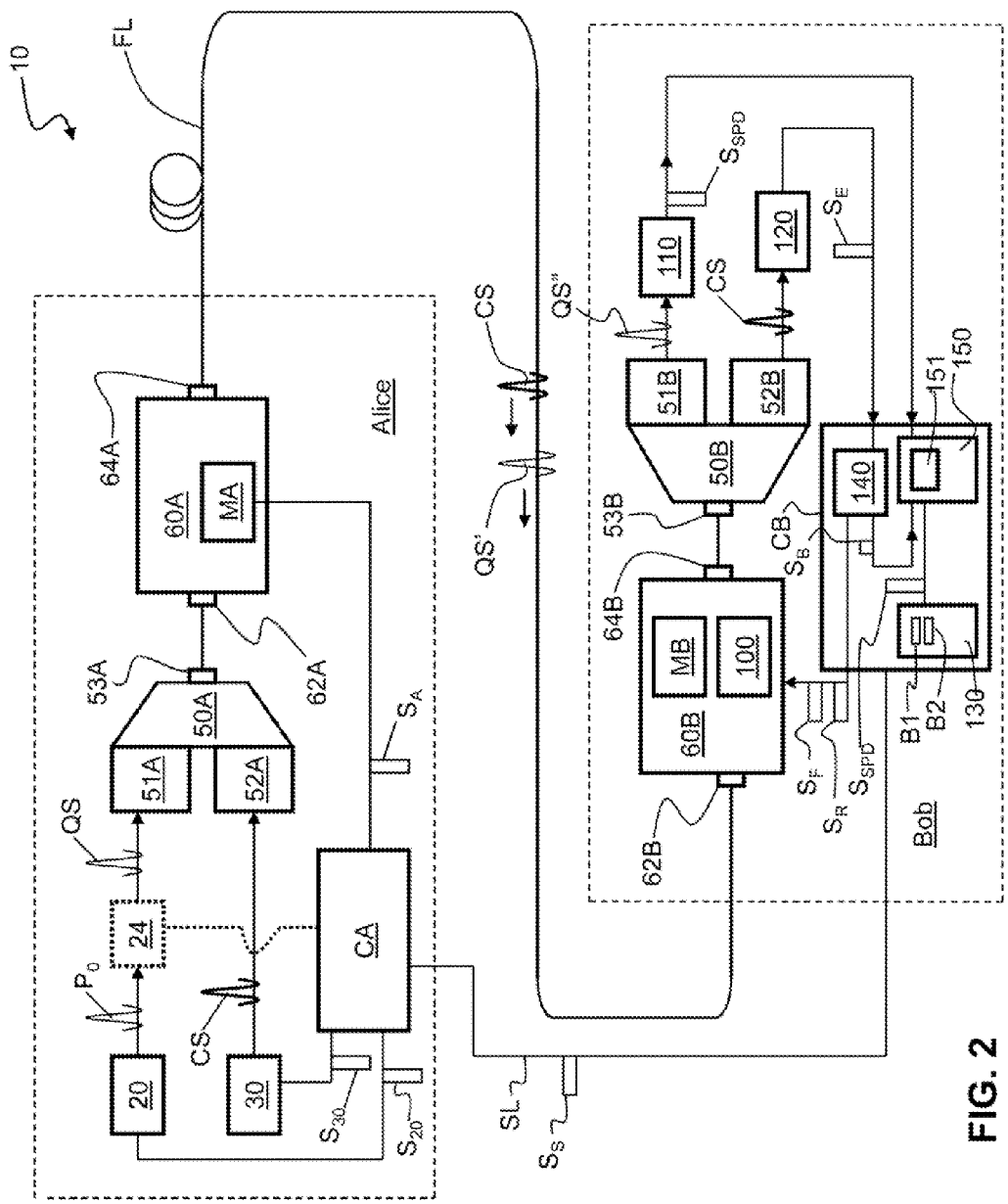
FIG. 2 is a schematic diagram of the QKD system adapted to provide for active compensation and SPD signal blanking.

An example embodiment of the present invention is now described in connection with a phase-based QKD system 10 as illustrated in FIG. 2. As mentioned above and as will be apparent to one skilled in the art, the present invention applies to any actively compensated QKD system, irrespective of the nature of the quantum signal encoding scheme.

Alice

With reference to FIG. 2, Alice includes a "quantum light source" 20 adapted to generate quantum signals QS of wavelength $\lambda_{QS}$. In one example embodiment, quantum light source 20 is optically coupled to an attenuator 24 that attenuates output laser pulses $P_0$ to create quantum signals QS in the form of weak pulses (i.e., one photon or less, according to Poissonian statistics). In another example embodiment, quantum light source 20 is a single-photon light source that generates true single-photon quantum signals QS (which in this case are the same as output laser pulses $P_0$). Alice also includes a "classical light source" 30 adapted to generate classical (i.e., multi-photon) signals CS of wavelength $\lambda_{CS}$. Classical signals CS are to be used as feedback signals for compensating the shared interferometer, as discussed below.

Alice further includes a wavelength division multiplexer (WDM) 50A optically coupled to quantum light source 20 and to classical light source 30 at respective input ports 51A and 52A. WDM 50A also includes an output port 53A that is optically coupled to an interferometer 60A at its input port 62A. Interferometer 60A also includes an output port 64A. Interferometer 60A further includes a modulator MA (e.g., a phase modulator) adapted to impart a randomly selected phase to the quantum signal QS as part of the QKD process. Interferometer 60A has associated therewith a first differential optical path length $OPL_A$ that can change due to environmental effects at Alice. Interferometer output port is optically coupled to one end of optical fiber link FL. Alice also includes a controller CA that is electrically coupled to modulator MA, quantum light source QS and classical light source CS (and variable optical attenuator 24 if such is present).

Bob

Bob includes an interferometer 60B that includes an input port 62B and an output port 64B. Alice's interferometer 60A and Bob's interferometer 60B are, strictly speaking, each interferometer halves and together constitute a "shared interferometer." Interferometer 60B includes a modulator MB (e.g., a phase modulator) adapted to impart a randomly selected phase to the quantum signal QS as part of the QKD process.

Interferometer 60B also has an associated differential optical path length $OPL_B$ that is, in principle, equal to $OPL_A$ to ensure ideal interference of quantum signals. However, $OPL_A$ and $OPL_B$ vary independently as a function of the different environmental effects at Alice and Bob. Accordingly, Bob also includes an adjustable phase/delay element 100 responsive to a feedback signal $S_F$ and adapted to change $OPL_B$ as discussed below.

Bob also includes a WDM 50B that includes an input port 53B and output ports 51B and 52B for quantum signals QS and classical signals CS, respectively. Output port 51B is optically coupled to a single-photon detector (SPD) unit 110, while output port 52B is optically coupled to a classical photodetector 120 (e.g., a photodiode). In another embodiment, Bob's interferometer 60B has more than one output 64B and requires a separate WDM 50B, SPD unit 110, and classical detector 120 for each output.

SPD unit 110 is electrically connected to a memory unit 130 included in Bob's controller CB. Controller CB also includes a feedback processing unit 140, as well as other processing electronics (not shown) such as, for example, a field-programmable gate array (FPGA), adapted to control the operation of Bob (e.g., gating the SPD unit 10, etc.).

Controller CB includes a signal-blanking unit 150 arranged between SPD unit 110 and memory unit 130. Signal-blanking unit 150 is operably coupled to feedback processing unit 140 and is adapted to receive therefrom a blanking signal $S_B$, as described below. In an example embodiment, signal-blanking unit 150 is or otherwise includes an AND gate 151 that receives an asserted low blanking signal $S_B$ and an asserted high SPD signal $S_{SPD}$. In normal operation the blanking signal is cleared (logical "1") and all SPD clicks (logical "1") pass through AND gate 151 and are stored in memory unit 130. During a system visibility glitch the blanking signal (logical "0") prevents the transmission of the SPD signal through AND gate 151, writing a logical "0" to memory unit 130 to trick it into thinking that the SPD did not fire.

Controller CB is also electrically coupled to interferometer 50B, to modulator MB, and to error-adjusting element 100, which in a phase-based QKD system is or includes an OPL/phase-adjusting element. Controller CB is also operably coupled to Alice's controller CA so that the overall system timing is coordinated. This is illustrated schematically by a synchronization link SL between the controllers that carries synchronization signals $S_S$. This synchronization link, however, can be established via optical fiber link FL.

QKD System Operation with Signal Blanking

System 10 operates as follows. Alice sends control signals $S_{20}$ and $S_{30}$ to quantum light source 20 and classical light source 30, respectively, to cause these light sources to generate respective quantum signals QS and classical signals CS. Quantum and classical signals QS and CS enter WDM 50A at respective input ports 51A and 52A and are multiplexed by the WDM and outputted at output port 53A. There is a time-delay between the two signals so that they do not overlap. The quantum and classical signals QS and CS enter interferometer 60A at input port 62A, wherein the quantum signal is modulated by modulator MA via a timed modulator activation signal SA from controller CA. The time-delay between quantum signal QS and classical signal CS is such that the classical signal passes through the modulator unmodulated (i.e., this signal lies outside of the gating interval provided by modulator activation signal $S_A$). Quantum signal QS thus becomes a once-modulated quantum signal QS'.

Classical signal CS and once-modulated quantum signal QS' exit interferometer 60A at output port 64B and are optically coupled onto optical fiber link FL, which carries the signals over to Bob. The signals enter Bob's interferometer 60B at input port 62B. Once-modulated quantum signal QS' is modulated by modulator MB via a corresponding timed modulator activation signal $S_B$ provided by controller CB, thereby forming a twice-modulated quantum signal QS". Again, the time-delay between classical signal CS and once-modulated quantum signal QS' leaves the classical signal unmodulated. Twice-modulated quantum signal QS" and classical signal CS exit interferometer 60B at output port 64B and travel to WDM 50B. The twice-modulated quantum signal QS" and the classical signal CS enter WDM 50B at input port 53B, are de-multiplexed by the WDM, and are respectively outputted at quantum signal output port 51B and classical signal output port 52B.

The twice-modulated quantum signal QS" is then detected by SPD unit 110. SPD unit 110 then generates an SPD signal $S_{SPD}$ representative of the overall phase modulation (plus the interferometer phase error) imparted to the original quantum signal QS by modulator MA at Alice and modulator MB at Bob. This information is then stored in memory unit 130. Meanwhile, classical signal CS, with only the phase error $\phi_E$ imparted upon it, is detected by photodetector 120, which in an example embodiment generates a corresponding "error signal" $S_E$ representative of a transient degradation in system visibility. Error signal $S_E$ is provided to feedback processing unit 140 in controller CB.

Feedback processing unit 140 receives error signal $S_E$ and processes it to produce an appropriate feedback signal $S_F$ to adjustable phase/delay element 100 to change the value of $OPL_B$ to eliminate any phase error. In doing so, adjustable phase/delay element 100 may need to be reset to an operating point near the center of its range of operation. In this case, it is reset to the middle of its range using a re-set signal $S_R$ from feedback processing unit 140.

When $\phi_E$ and thus $S_E$ are large (thereby requiring a "large" feedback signal $S_F$), it indicates an imbalance between interferometers 60A and 60B. SPD signals $S_{SPD}$ obtained when the system is in an unbalanced state have a higher probability of increasing the quantum-bit error rate (QBER) since they are more likely to represent "bad" measurements. Errors in the raw quantum key cause a non-linear reduction in the length of the final secure quantum key because of non-linear error-correction and privacy amplification protocols used to obtain a perfectly symmetric quantum key (at least to within a tolerable error). Said differently, such errors reduce the key transmission rate since more quantum signals are needed to establish a quantum key of a given length.

The measurement of $S_E$ represents a measurement of the phase error $\phi_E$, which is superimposed onto the quantum signal bits along with the phases applied by MA and MB. The present invention reduces the QBER by preventing ("blanking") certain SPD signals $S_{SPD}$ associated with a large superimposed phase error $\phi_E$ from being stored in memory unit 130 and being used in forming the shared quantum key. The blanking is accomplished by feedback processing unit 140 providing one or more blanking signals $S_B$ to memory unit 130 that blanks (prevents) certain SPD signals $S_{SPD}$ (and thus qubits) from being stored in memory. The generation of blanking signals $S_B$ is based on the value of $S_E$, which represents uncertainty as to the phase state of the quantum pulse(s).

In an example embodiment, a tolerable phase error threshold $\phi_{TH}$ is set, which corresponds to a tolerable phase error signal threshold $S_{TH}$. Thus, certain qubits represent "below threshold" qubits for which $S_E \leq S_{TH}$ and which are stored in memory unit 130, while certain qubits represent "above threshold" qubits for which $S_E > S_{TH}$. The above-threshold qubits are blocked from being stored in memory unit 130 via blocking signals $S_B$.

In an example embodiment as discussed above, this is accomplished by signal-blanking unit 150 that is or includes AND gate 151 arranged between SPD unit 110 and memory unit 130. Blocking signals (logical zero) $S_B$ is provided to AND gate 151 to prevent the flow of SPD signals from SPD unit 110 to memory unit 130 for any above-threshold qubits. In another example embodiment, all qubits are stored in an initial raw-bits buffer B1 in memory unit 130, and blocking signals are used to identify which qubits should be forwarded to a secondary raw-bits buffer B2 in memory unit 130 that only includes below-threshold qubits.

By storing only below-threshold qubits in memory unit 130, fewer errors are introduced into the raw quantum key. This, in turn, leads to fewer errors in the final quantum key, which is formed by sifting, error-correcting and privacy amplifying the raw key. It also leads to a longer final quantum key for a given number of exchanged qubits because the errors are reduced upfront in the raw key rather than through the aforementioned downstream processing.

The above description presents a binary approach for the processing of $S_E$, appropriate for implementation through digital hardware. Another approach may be performed in software by adapting the error correction and privacy amplification protocols.

The typical error correction protocols do not assume any knowledge of which bits have errors. Consequently, the algorithm searches all the bits for errors. Possibly some of the secret bits are revealed as a result of this protocol resulting in their loss. The more errors are present, the more bits are lost. By using $S_E$ to assign a bit-error probability to each bit, erroneous bits can be located while revealing less information and/or without having to search all of the bits.

This idea may be extended to the privacy amplification process as well. Normally all errors are associated with tampering caused by Eve. The compression ratio, or reduction of secure bits, used in the privacy amplification protocol is usually based on the measured QBER, meaning that higher QBER lead to a greater reduction in the final key rate. However, it is possible to associate a bit-error probability based upon measured values of $S_E$. In an example embodiment, this forms the basis for a new privacy amplification algorithm that adjusts the compression ratio by separating the errors caused by phase errors induced by environmental disturbances at the interferometers from those created by other unknown sources (i.e., Eve).

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of forming a quantum key by exchanging quantum signals between first and second QKD stations of an actively stabilized QKD system that has a system visibility, comprising:

measuring the system visibility between the first and second QKD stations during the exchanging of quantum signals, using an unmodulated, non overlapping classical signal multiplexed with the quantum signals;

generating an error signal $S_E$ representative of a transient degradation in the system visibility;

setting an error-signal threshold $S_{TH}$ that defines an upper bound on the transient degradation of the system visibility;

detecting the quantum signals to form qubits based on the quantum signals; and forming a raw quantum key by storing only below-threshold qubits for which $S_E \leq S_{TH}$, wherein the QKD system is a phase-encoding system and the quantum signal error is a phase error, generating a final quantum key from the raw quantum key by sifting, error-correcting and privacy amplifying the raw key.

2. The method of claim 1, including:

storing the qubits in a memory unit; and sending blanking signals $S_B$ to the memory unit so as to prevent above-threshold qubits, for which $S_E > S_{TH}$ from being stored in the memory unit.

3. The method of claim 1, including:

forming from the error signal $S_E$ a feedback signal $S_F$;

providing the feedback signal $S_F$ to an error-adjusting element so as to reduce the quantum signal error.

4. The method of claim 1, wherein the first and second QKD stations each include first and second interferometers operably coupled by an optical fiber link, and wherein measuring the quantum signal error includes transmitting classical signals over the first and second interferometer loops and the optical fiber link.

5. A method of forming a quantum key, comprising:

exchanging quantum signals over an optical path between first and second QKD stations of an actively stabilized QKD system;

measuring quantum signal errors representative of a transient degradation in the system visibility that arise due to instabilities in the QKD system using an unmodulated, non overlapping classical signal multiplexed with the quantum signals;

detecting the quantum signals to form qubits;

forming a raw quantum key from only those qubits for which the quantum signal error is below an error threshold representative of a transient degradation in the system visibility, wherein the QKD system is a phase-based system, wherein the quantum signal error is phase error $\phi_E$, and wherein and the select error threshold is a threshold phase error value $\phi_{TH}$, and generating a final quantum key from the raw quantum key by sifting, error-correcting and privacy amplifying the raw key.

6. The method of claim 5, including generating an error signal $S_E$ representative of the phase error $\phi_E$;

establishing a error signal threshold $S_{TH}$ representative of threshold phase error value $\phi_{TH}$; and storing only those qubits for which the $S_E \leq S_{TH}$.

7. The method of claim 6, wherein the qubits are stored in a memory unit, and including:

generating a blanking signal $S_B$ adapted to block the storing of above-threshold qubits for which $S_E > S_{TH}$; and sending the blanking signal to the memory unit to prevent the storing therein of above-threshold qubits.

8. A receiving QKD station of an actively stabilized QKD system adapted to exchange quantum signals over an optical path and that has a system visibility, the receiving QKD station, comprising:

a photodetector unit adapted to detect a classical signal sent over said optical path and in response there to generate error signals $S_E$ representative of a transient degradation in the system visibility of said system, the classical signal is an unmodulated, non overlapping classical signal multiplexed with the quantum signals;

a controller adapted to track the system visibility error during the exchange of quantum signals via said error signals $S_E$ and generate therefrom blocking signals $S_B$ corresponding to above-threshold quantum signals for which $S_{E \leq STH}$, wherein $S_{TH}$ is a threshold signal corresponding to a system visibility error limit; and a memory unit in or operably couple to the controller and adapted to store qubits as a raw quantum key, the memory unit being further adapted to receive the blocking signal $S_B$ and in response thereto block the storing of qubits coinciding with above-threshold system visibility error so that the memory unit only stores qubits coinciding with below-threshold system visibility error for which $S_{E \leq STH}$, wherein the QKD system is a phase-based QKD system, and wherein the quantum signal error is a phase error $\phi_E$ and $S_{TH}$ corresponds to a phase-error threshold limit $\phi_{TH}$;

generating a final quantum key from the raw quantum key by sifting, error-correcting and privacy amplifying the raw key.

\* \* \* \* \*